(12) United States Patent
Lingampally et al.

(10) Patent No.: US 11,336,632 B2
(45) Date of Patent: *May 17, 2022

(54) COMPOSITE USER IDENTITIES IN DISTRIBUTED COMPUTING SYSTEMS

(71) Applicant: INTUIT INC., Mountain View, CA (US)

(72) Inventors: Parikshit Lingampally, San Francisco, CA (US); Glenn C. Scott, Mountain View, CA (US); Michael R. Gabriel, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/853,455

(22) Filed: Apr. 20, 2020

(65) Prior Publication Data

US 2020/0244645 A1 Jul. 30, 2020

Related U.S. Application Data

(63) Continuation of application No. 15/796,671, filed on Oct. 27, 2017, now Pat. No. 10,630,673.

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/102* (2013.01); *H04L 63/107* (2013.01)

(58) Field of Classification Search
CPC . H04L 63/0815; H04L 63/102; H04L 63/107; G06F 21/41; G06F 21/40
See application file for complete search history.

(56) References Cited

U.S. PATENT DOCUMENTS

| | | | |
|---|---|---|---|
| 8,955,045 B2* | 2/2015 | Smith | H04L 12/1822 726/2 |
| 9,602,490 B2* | 3/2017 | Durham | H04L 9/3231 |
| 10,630,673 B1* | 4/2020 | Lingampally | H04L 63/0815 |
| 2011/0035788 A1 | 2/2011 | White et al. | |
| 2012/0159590 A1 | 6/2012 | Novack et al. | |
| 2015/0128240 A1 | 5/2015 | Richards et al. | |

* cited by examiner

*Primary Examiner* — Baotran N To
(74) *Attorney, Agent, or Firm* — Patterson + Sheridan, LLP

(57) ABSTRACT

The present disclosure relates to generating composite user identities in a distributed computing system. According to one embodiment, an example method generally includes transmitting, to a plurality of identity providers, a request for user identity information. A service provider receives, from a subset of the plurality of identity providers, the user identity information and selects a subset of the received user identity information to be used in verifying an identity of a user based, at least in part, on a reputation score associated with each identity provider in the subset of identity providers. The service provider generates a composite user identity based on the selected subset of the received user identity information. The service provider takes one or more actions to enable use of a service based on the generated composite user identity.

20 Claims, 5 Drawing Sheets

COMPOSITE USER IDENTITIES IN DISTRIBUTED COMPUTING SYSTEMS

CROSS-REFERENCE TO RELATED APPLICATIONS

This application is a continuation of U.S. patent application Ser. No. 15/796,671, entitled "Composite User Identities in Distributed Computing Systems", filed Oct. 27, 2017 and assigned to the assignee hereof, the contents of which are hereby incorporated by reference in their entirety.

INTRODUCTION

Aspects of the present disclosure relate to distributed computer systems, and more specifically to determining user identity in a distributed computer system based on identity information provided by various members of the distributed computer system.

BACKGROUND

In distributed computing systems, multiple computing devices may cooperate to perform a variety of tasks. These computing devices may be owned and managed by separate entities but may communicate with each other according to protocols that define the manner in which data is exchanged between various computing devices in the distributed computing system. In some cases, the data may be exchanged to allow for distributed processing of a workload (e.g., to leverage the power of parallel processing in computationally intensive workloads). In some cases, the data may be exchanged to augment a data set used by one member of the distributed computing system with data sourced from one or more other members of the distributed computing system, which may provide a more complete universe of data that members of the distributed computing system can use to perform various computational tasks.

Various computing devices may use user identity information to determine whether to allow a particular user to access a web service, such as messaging applications (e-mail, instant messaging, etc.), social networking, financial services (online banking, online investing platforms, etc.), and other services that are tailored to a particular user. The user identity information may include, for example, a username and password used to log into a web service. Within a particular web service, the user identity information may be linked to varying amounts of personal information. For example, a user identity associated with a messaging service may be associated with the user's name and a recovery phone number, while a user identity associated with a social network may include the user's name, e-mail address, and phone number. In some cases, where user identity information is used to access more protected systems, such as systems provided by financial institutions, sensitive data providers, or the like, user identity information may include personally identifiable information that has been verified by the owner of the web service. For example, due to various regulations, financial institutions may be required to obtain a national identification number (e.g., Social Security Number information in the United States, National Insurance Number information in the UK, etc.), a copy of a government-issued photographic identifier (e.g., a driving license or a passport), a copy of a user's signature, and/or other information that more conclusively identifies a person.

For various reasons, user identity information may not be shared across different web services. Because user identity information may be siloed data that is owned and not shared by a particular web service, new services may not be able to leverage already-known data to generate its own user identity data for a specific user. Thus, a need exists for the sharing of user identity data for creating and managing user identities in a distributed network.

BRIEF SUMMARY

One aspect of the present disclosure provides a method for generating composite identities in a distributed network. The method generally includes transmitting, to a plurality of identity providers, a request for user identity information. A service provider receives, from a subset of the plurality of identity providers, the user identity information and selects a subset of the received user identity information to be used in verifying an identity of a user based, at least in part, on a reputation score associated with each identity provider in the subset of identity providers. The service provider generates a composite user identity based on the selected subset of the received user identity information. The service provider takes one or more actions to enable use of a service based on the generated composite user identity.

Another aspect of the present disclosure provides a system comprising a processor and memory. The memory generally has instructions stored therein which, when executed by the processor, performs an operation for generating composite identities in a distributed network. The operation generally includes transmitting, to a plurality of identity providers, a request for user identity information. A service provider receives, from a subset of the plurality of identity providers, the user identity information and selects a subset of the received user identity information to be used in verifying an identity of a user based, at least in part, on a reputation score associated with each identity provider in the subset of identity providers. The service provider generates a composite user identity based on the selected subset of the received user identity information. The service provider takes one or more actions to enable use of a service based on the generated composite user identity.

Still another aspect of the present disclosure provides a computer-readable medium having instructions stored therein which, when executed on a processor, performs an operation for generating composite identities in a distributed network. The operation generally includes transmitting, to a plurality of identity providers, a request for user identity information. A service provider receives, from a subset of the plurality of identity providers, the user identity information and selects a subset of the received user identity information to be used in verifying an identity of a user based, at least in part, on a reputation score associated with each identity provider in the subset of identity providers. The service provider generates a composite user identity based on the selected subset of the received user identity information. The service provider takes one or more actions to enable use of a service based on the generated composite user identity.

The following description and the related drawings set forth in detail certain illustrative features of one or more embodiments.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, are therefore not to be considered limiting of its scope, and may admit to other equally effective embodiments.

DETAILED DESCRIPTION

Figure 1:
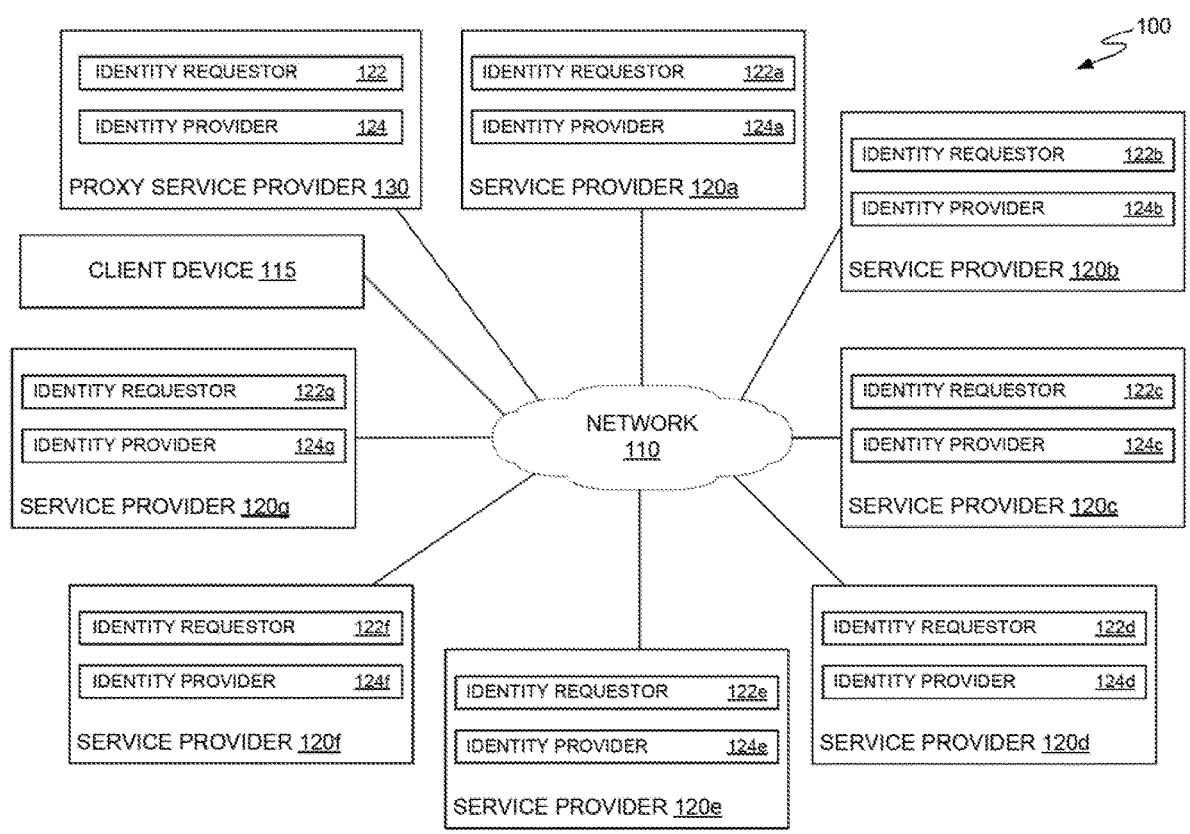
FIG. 1 illustrates an exemplary distributed network including a plurality of service providers that provide and request user identity information from other members of the distributed network, according to an embodiment.

Various service providers maintain and use user identity information to enable access to a network service (e.g., a web service accessible via the Internet and/or private services accessible through an internal network). Each service provider generally verifies user-provided information according to their own rules and regulations. For example, an e-mail service may verify user-provided identity information using a recovery phone number, while a social media service may verify user-provided information by sending a message to a user-specified e-mail address or phone number. For some services which are required by law to collect and verify certain information, such as financial service providers that are required to comply with "know your client" regulations, these service providers may verify user-provided information against, for example, known data providers, such as credit agencies or government agencies.

Because service providers may have already vetted user-provided information, this information can be leveraged to enable other members in the distributed network to generate composite user identities that can be used, for example to enable user access to a new web service. However, because different service providers perform different levels of verification against user-provided authentication information, different levels of trust may be assigned to each service provider. For example, an organization that is required by law to comply with "know your client" regulations may be considered to be a trustworthy source of identity information. In contrast, a service provider that performs a limited amount of data verification or hosts a large number of fake or compromised accounts may be considered a less trustworthy source of user identity information.

Aspects of the present disclosure provide for the generation of composite identities from identity information provided to a requesting device from a plurality of identity sources in a distributed network (e.g., the internet). The composite identity information may be generated based on a measure of trustworthiness or reputation for each provider in a distributed network. By leveraging crowdsourced user identity information from a plurality of identity sources (e.g., service providers that collect user information for use in allowing access to a service), a service requestor can generate a composite identity from the plurality of different sources that includes user information that has been verified by the plurality of different sources. Because the user information included in a composite identity may have been verified by a plurality of sources, the service provider can generate a user credentials for access to a service using information that is likely to be accurate and to uniquely identify the user rather than an impostor or some other party other than the user (or a representative of the actual user).

Further, by leveraging crowdsourced user identity information to generate a composite user identity, a service provider can compare the data received from a user with user identity information previously obtained by other service providers in a pairwise comparison. If the data provided to the service provider matches the data previously provided to other service providers, the service provider may have increased confidence in the accuracy of the data provided by the user to the various service providers in a distributed system. Further, by having increased confidence in the accuracy of the data provided to the various service providers, a service provider can obtain user identity data from other service providers to generate a composite user identity with confidence that the data obtained from other service providers is accurate. Further, through the use of pairwise comparisons between data provided to a service provider and crowdsourced data provided from other service providers, the accuracy and validity of the provided and crowdsourced user identity data may be increased, which may increase the security of network-based services by preventing fraudulent use thereof.

FIG. 1 illustrates an exemplary networked computing environment 100, according to an embodiment. As illustrated, computing environment 100 includes a client device 115, a plurality of service providers 120a-120g, each of which is connected via network 110. In some embodiments, computing environment 100 may additionally include a proxy service provider 130 connected to network 110.

As illustrated, each service provider 120a-120g generally includes an identity requestor 122a-122g and an identity provider 124a-124g. An identity requestor (e.g., identity requestor 122a at service provider 120a) generally requests user identity information from a plurality of other service providers 120 (e.g., one or more service providers 120b-120g) and generates a composite user identity based on the received user identity information. Each service provider 120a-120g may have knowledge of the other service providers 120 in network 110 via a centralized registry or a local registry which includes a list of the service providers 120a-120g in network 110 and is updated as service providers are added (e.g., in response to receiving information broadcast by a new service provider that the new service provider has joined network 110). In some embodiments, identity requestor 122 may request user identity information directly from a plurality of service providers 120a-120g in computing environment 100 and generate a composite user identity from at a portion of the user identity information received from the plurality of service providers. In other embodiments, a service provider 120a may request a composite user identity from proxy service provider 130, as discussed in further detail herein.

Identity requestor 122a may be invoked when a user of a client device 115 requests access to a service provided by service provider 120a. In some embodiments, the request for access to the service provided by service provider 120*a* may include some information that uniquely identifies a user. The information that uniquely identifies a user may include, without limitation, the user's legal name, address, national identity number (e.g., a U.S. Social Security Number, a UK National Insurance Number, etc.), date of birth, driving license number, passport number, a signed W-4 form on record with a service provider, or other information that a service provider has obtained (and, in some cases, verified) about a user. To request user identity information from the service providers 120*b*-120*g* in computing environment 100, an identity requestor 122 can transmit a request to the plurality of service providers 120, directly or through proxy service provider 130, in computing environment 100 for identity information stored at each of the plurality of service providers. The request may include at least a portion of the user identity information provided by a user in the request for access to the service provided by service provider 120. Identity requestor 122 may transmit the request to the plurality of service providers 120 as a representational state transfer (REST) request, a graph query language (GraphQL) request, an HTTP GET request, or other request including at least the portion of the user identity information. A RESTful request allows a service provider 120*a* to request data from another service provider 120*b* by accessing a URL provided by the service provider 120*b* with one or more parameters represented as a URL path, and the responding service provider 120*b* may provide the requested data to service provider 120*a* in an easily parseable format (e.g., a JSON file, an XML file, or the like). A graph query language request may be used to specify the data fields that a user is requesting along with the parameters for the data to be returned, which may allow a service provider 120*a* to request data with more granularity than a RESTful request. For service providers 120*a*-120*g* that do not expose RESTful, graph query language, or other data request front-ends for requesting data, standard HTTP GET requests may be used in which a requesting service provider 120*a* explicitly requests data from a destination address with parameters in the URL following the destination address.

In response, identity requestor 122*a* receives user identity information from a plurality of the service providers 120*b*-120*g* connected to network 110. In some embodiments, a service provider 120*b* may transmit data to identity requestor 122*a* indicating whether or not a matching user exists in the records maintained by the service provider 120*b*. If a service provider 120*b* provides a negative response to the request for user identity information, the service provider 120*b* need not include any other information in the response. If, however, service provider 120*b* indicates that a matching user exists in the records maintained by the service provider 120*b*, service provider 120*b* may, in some embodiments, include additional information in the response. This additional information generally includes information associated with the provided user identity information that a service provider possesses. For example, in an example where identity requestor 122*a* provides a user name and contact information to the plurality of service providers 120*b*-120*g* in the request for user identity information, the service providers 120*b*-120*g* may respond with information indicating that the provided user identity information matches the user identity information in their records along with other user identity information that may be relevant, such as a driving license number, a national identification number (e.g., a U.S. Social Security Number), a signed W-4 form on record, or other additional information that a service provider has obtained for the specified user.

Identity requestor 122*a* generally aggregates the received user identity information from the plurality of service providers 120*b*-120*g* that returned user identity information in response to the request. In some embodiments, identity requestor 122*a* can determine whether to include or exclude user identity information returned from a service provider based on a reputation score associated with each service provider 120*b*-120*g*. Identity requestor 122*a* can receive reputation scores associated with a service provider 120*b*-120*g* periodically in messages broadcast over network 110, asynchronously in messages transmitted from a service provider 120*b*-120*g* when the reputation score of a service provider changes, or as additional data included in a response to a request for user identity information transmitted to a service provider 120*b*-120*g* by identity requestor 122*a*.

Generally, each service provider 120*a*-120*g* may be assigned a composite reputation score based on the trustworthiness assigned to a service provider 120*a* by other service providers 120*b*-120*g* in computing environment 100. The reputation score assigned to a first service provider 120*a* by a second service provider 120*b* generally indicates an amount of trust the second service provider has in the information maintained by the first service provider 120*a* and/or processes used by the first service provider 120*a* to verify user identity information. For example, a service provider 120*a* maintained by a large financial services institution may assign a high reputation score to a peer financial services institution (e.g., a financial services institution that is required by law or policy to follow similar user identity verification procedures and is of a similar size, or a financial services institution that has a banking relationship with the financial services institution that maintains service provider 120*a*) and government agencies against which the financial services institution verifies user-provided information. The service provider 120*a* may assign a lesser, but still high, reputation score to a smaller financial services institution. Meanwhile, the service provider 120*a* may assign lesser reputation scores to other sources of user identity data, such as messaging services or social media services, as the providers of these services may not perform as extensive verification procedures on user-provided identity information. A different service provider 120*b*, which may be maintained, for example, by a social networking service, may assign different reputation scores to each service provider 120*a* and 120*c*-*g* in computing environment 100. For example, service provider 120*b* may assign reputation scores at a predefined base level to peer social networking services (e.g., social networking services of a similar size and scope) and assign reputation scores that are lower than the predefined base level to social networking services that are newer, have fewer users, and so on. Meanwhile, service provider 120*b* may assign reputation scores that are greater than the predefined base level to service providers 120 that perform more extensive verification of user identity information (e.g., financial services institutions, employers, etc.) or are otherwise considered to be authoritative sources of user identity information (e.g., credit reporting agencies, government agencies, and the like).

To calculate the composite reputation score of a first service provider 120*a*, the first service provider may request reputation score information from the other service providers 120*b*-120*g* in computing environment 100. Service providers that do not return a reputation score may, in some embodiments, be omitted from the calculation of a composite reputation score until those service providers establish a reputation score for the first service provider 120*a*. For the set of service providers 120b-120g that do return a reputation score for the first service provider 120a, the reputation score of the first service provider can be calculated according to the reputation score assigned to the first service provider 120a by each of the service providers 120b-120g in computing environment 100. In some cases, the composite reputation score may be calculated for a specific type of user identity information provided by the service provider 120a. For example, a service provider 120a may be assigned a first reputation score for legal name data, a second reputation score for national identity number data, and so on. Generally, the composite reputation score for a specific type of user identity information may be represented as:

$$ReputationScore = \sum_{i=0}^{n} [ReputationScore_{requestor_i, identityDataType} * ReputationScore_{requestor_i}]$$

The reputation score for a specific requestor may be normalized to represent a relative level of trust a requesting service provider 120a has in a specific service provider relative to a scale (e.g., a 0-100 scale, where, 0 indicates that a service provider is wholly untrusted and 100 indicates that a service provider is fully trusted). For example, suppose that service provider 120a requests a user's legal name from three service providers: a large, multinational bank (service provider 120b), a small, regional bank (service provider 120c), and an e-mail service (service provider 120d). The service providers 120b, 120c, and 120d, for the purposes of this example, have the reputation scores listed below in Table 1:

TABLE 1

| Service Provider | Reputation Score for Identity Data Type | Reputation Score for Service Provider |
| --- | --- | --- |
| 120b | 95 | 99 |
| 120c | 95 | 90 |
| 120d | 50 | 20 |

Based on the reputation scores listed above in Table 1, service provider 120b may have a calculated reputation score for the legal name identity data type of 95*(99/100), service provider 120c may have a calculated reputation score for the legal name identity data type of 95*(90/100), and service provider 120d may have a calculated reputation score for the legal name identity data type of 50*(20/100). The reputation score for the user's legal name, based on the equation above, would be the summation of these three scores. By way of example, the calculated reputation score for the legal name identity data type may be calculated to be 189.55 (94.05+85.5+10).

Based on the calculated reputation scores for each service provider 120 that returns a reputation score for a specific user identity data type, a service provider 120 can, in some embodiments, determine whether to use the user identity information in generating a composite identity. The service provider 120 may determine whether to include or exclude user identity information from a composite identity based on a comparison of a threshold reputation score and a reputation score associated with the source of user identity information. Each service provider 120 may maintain its own threshold reputation score based on a minimum amount of trust that the service provider 120 needs to have in the user identity information provided by another service provider. For example, using the financial services institution service provider example discussed above, service provider 120 may set a threshold reputation score such that user identity information provided by peer financial institutions, other financial institutions, and government entities may be used in generating a composite identity because the data provided by these service providers 120 may be considered trustworthy. The threshold reputation score may be set to be greater than the reputation scores associated with the service providers 120 maintained by messaging and social networking services, as the financial services institution may not have a sufficient level of trust in the user identity provided by a messaging or social networking service and/or the verification processes used by a messaging or social networking service to verify the authenticity and accuracy of user-provided identity information.

In some embodiments, identity requestor 122 may use the user identity information received from each of the service providers 120 that return user identity information to generate a composite user identity, irrespective of the reputation score associated with a service provider 120. Identity requestor 122 may calculate a reputation score associated with the composite user identity based on the reputation scores associated with each service provider 120 that returns user identity information to identity requestor 122. For example, the composite reputation score for a composite user identity may be represented as a summation of the composite reputation scores associated with each service provider 120, weighted according to the reputation score assigned to each service provider 120b-g by the service provider 120a hosting identity requestor 122a. In some cases, the weightings may be generated as a ratio of the reputation score assigned to a particular service provider 120b-120g and the highest reputation score assigned to any service provider 120b-120g in computing environment 100 by the requesting service provider 120a or some other maximum value. The composite user identity score may be represented according to the equation:

$$CompositeScore = \sum_{i}^{n} WeightingFactor_{source_i} * GlobalReputationScore_{source_i}$$

To illustrate, suppose that service provider 120a generates a composite user identity from information provided by service providers 120b, 120c, 120d, 120e, and 120f. The global reputation scores and weighting factors assigned to these reputation scores by service provider 120a are listed below in Table 2:

TABLE 2

| Service Provider | Weighting Factor | Global Reputation Score for Service Provider |
| --- | --- | --- |
| 120b | 0.99 | 96 |
| 120c | 0.89 | 98 |
| 120d | 0.75 | 87 |

TABLE 2-continued

| Service Provider | Weighting Factor | Global Reputation Score for Service Provider |
|---|---|---|
| 120e | 0.43 | 45 |
| 120f | 0.10 | 16 |

The composite score for the composite user identity may be represented as the summation of (weighting factor*global reputation score) for each of service providers 120b-120f. Service provider 120b may thus be assigned a value of 0.99*96=95.04; service provider 120c may be assigned a value of 0.89*98=87.22; service provider 120d may be assigned a value of 0.75*87=65.25; service provider 120e may be assigned a value of 0.43*45=19.35; and service provider 120f may be assigned a value of 0.10*16=1.6. The composite score for the composite user identity may thus be the summation of these values, which results in a composite score of 268.46. Generally, the weighting of global reputation scores allows the service providers with the most trusted data to make the highest contributions to the composite identity score, while service providers with low reputation scores may make a de minimis contribution to the composite identity score.

Based on the calculated composite user identity score, identity requestor 122 can determine whether the generated composite user identity is valid for use in identifying a user on a service provided by service provider 120. In some embodiments, identity requestor 122 can determine whether the composite user identity is valid for use based on a comparison of the composite user identity score to a threshold value. If the composite user identity score is less than the threshold value, identity requestor 122 can reject the generated composite user identity. In some embodiments, where identity requestor 122 rejects the generated composite user identity, identity requestor 122 can initiate a user registration process to obtain and verify additional user identity information from the user. By attempting to generate a composite user identity before requesting a full set of user identity data from a user of the service, a service provider 120 can attempt to accelerate the process of generating a user profile based on crowdsourced data that is presumed to have been previously verified, which may reduce the amount of time a user spends accessing a service, may increase the likelihood that the composite user identity used to access a service provided by service provider 120a is accurate and verifiable, and may improve the security of these online services through the use of previously verified data.

Otherwise, if the composite user identity score meets or exceeds the threshold user identity score, identity requestor 122 can accept the composite user identity for use in accessing one or more services provided by service provider 120. In some embodiments, identity requestor 122 can add the received user identity information to a user data repository 240 (illustrated in FIG. 2) and associate the user identity information to login credentials for accessing the one or more services. If a user account has already been created, the composite user identity may be used to verify that the user information associated with the user account is correct and belongs to the specified user. If the data in the user account and the composite user identity match, identity requestor 122 can deem the user account to be authenticated and allow access to the services provided by the service provider 120. Otherwise, the user account fails authentication, and identity requestor 122 may delete the account or otherwise block a user associated with the provided user credentials from accessing the services provided by service provider 120.

In some embodiments, an identity requestor 122 may specify, in the request for user identity information from the plurality of service providers 120, that the user identity information provided by one or more identity sources should be valid for a specified amount of time. In response, one or more of the service providers 120 that respond with user identity information may stake a portion of its global reputation score on the validity of the provided user identity information for the specified period of time. In some aspects, by staking a portion of a service provider's global reputation score on the validity of the provided user identity information, other service providers 120 in a distributed network may assign a higher level of trust to that service provider. If the user identity information remains valid throughout the specified period of time, the global reputation scores for the responding service providers 120 may remain unchanged. If, however, identity requestor 122 determines that the user identity information provided by a first service provider 120 is invalid or becomes invalid before the end of the specified period of time, identity requestor 122 can indicate, to the other service providers 120 in computing environment 100, that the global reputation score associated with the first service provider 120 should be reduced by the staked portion specified by the first service provider 120. In some embodiments, each service provider may maintain a ledger indicating cumulative amounts by which the reputation score of each service provider 120 in computing environment 100 should be reduced.

In some embodiments, the reputation score associated with each service provider 120 may be subject to a decay function based on the last time that the service provider 120 provided user identity information to another service provider 120 in computing environment 100. The decay function may be, for example, an exponential decay function, a linear decay function, or any other decay function that causes a decrease in the global reputation score of a service provider over time. The time factor used in the decay function may be set such that the reputation score of a service provider 120 is not affected by a threshold time period of inactivity (e.g., one week, one month, etc.) but decays as additional time periods pass without the service provider 120 providing user identity information to other service providers 120 in computing environment 100. To account for a decay in a reputation score, each service provider 120 may maintain a timestamp representing the most recent request for user identity information for which the service provider 120 generated an affirmative response and may broadcast the timestamp to the service providers 120 in in computing environment 100. In some cases, the timestamp may be broadcast to each service provider along with the global reputation score associated with each service provider 120. Each service provider 120 may be configured with the same decay function for use in calculating the reputation score of a service provider 120 in computing environment 100, which may allow for a uniform determination of reputation scores throughout computing environment 100.

Identity provider 124 generally receives requests for user identity information from one or more service providers 120 and generates a response to each received request. To generate a response, identity provider 124 can determine whether user identity information matching the provided user identity information exists at the service provider 120 hosting identity provider 124. If identity provider 124 does not find any matching user identity information, identity provider 124 can transmit a negative response to the requesting service provider 120. Otherwise, identity provider 124 can transmit an affirmative response to the requesting service provider 120 and, in some embodiments, provide additional user identity information to a requesting service provider 120 for use in verifying a user identity and generating a composite user identity, as discussed above. In some cases, as discussed above, identity provider 124 may additionally broadcast reputation score information to service providers 120 in computing environment 100. The reputation score information generally includes a global reputation score determined from the reputation scores assigned to a service provider 120 by each member of computing environment 100. The reputation score information may further include one or more of an adjustment value representing an amount of the global reputation score that has been deducted from the global reputation score from previous provision of invalid user identity information and a timestamp representing the most recent provision of user identity information by the service provider 120 hosting identity provider 124. As discussed, this additional information may be used to adjust a reputation score to account for instances where a service provider 120 has staked a portion of its reputation score on the provisioning of inaccurate information and a decay function that reduces the reputation and relevance of a service provider 120 as activity decreases at a particular service provider.

In some embodiments, computing environment 100 may include a proxy service provider 130 that maintains and generates composite user identities for service providers 120 that request user identity information through the proxy service provider 120. A service provider 120a that uses proxy service provider 130 may, for example, not wish to expose its own user identity information to other service providers 120b-g in network 110. In other cases, a service provider 120a that uses proxy service provider 130 may be a service that uses common user identity and login information with other service provider 120 that use proxy service provider 130. The proxy service provider 130 generally acts as an identity requestor and source for a plurality of service providers 120 in computing environment 100. As illustrated, proxy service provider 130 generally includes an identity requestor 122 and identity provider 124 that implement the functionality described above. Through proxy service provider 130, a service provider 120a can request user identity information from other service providers 120 and receive a composite user identity from the proxy service provider 130. In generating a composite user identity, a proxy service 130 may maintain its own reputation scores for each service provider 120 in computing environment 100 and generate a composite user identity according to the reputation scores maintained for each service provider. A service provider 120 that requests user identity information from proxy service provider need not expose its own user identity information to other service providers in computing environment 100 because proxy server 130 may expose a common set of user identity information to service providers 120 (other than those that obtain a composite user identity from proxy service provider 130) in computing environment 100.

Figure 2:
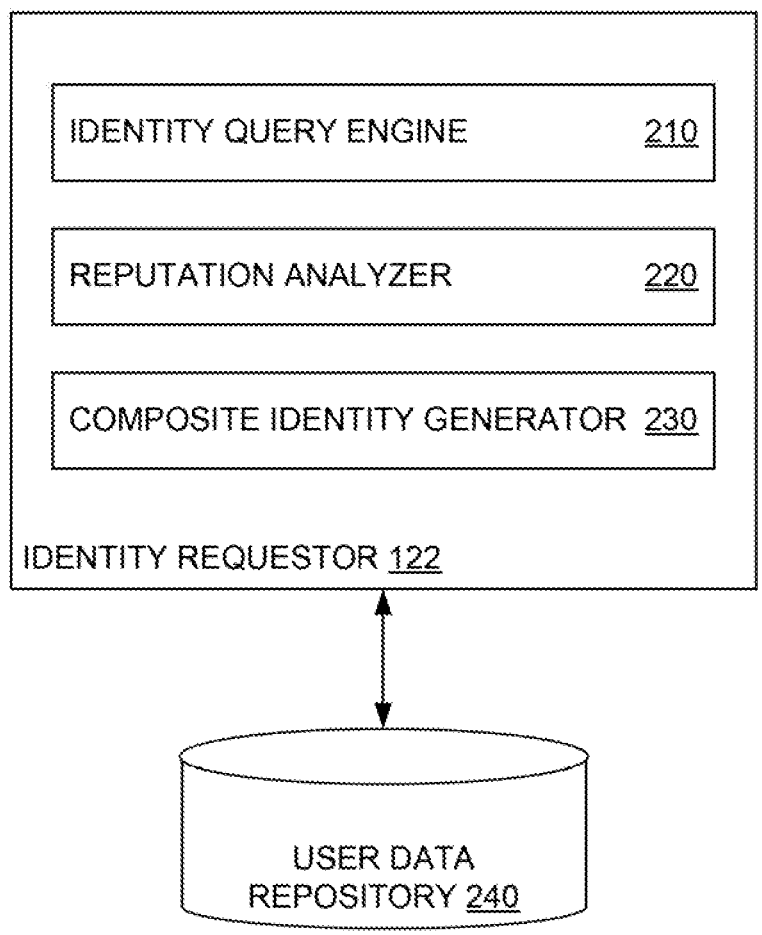
FIG. 2 illustrates an exemplary user identity requestor, according to an embodiment.

FIG. 2 illustrates an exemplary identity requestor 122, according to an embodiment. As illustrated, identity requestor 122 generally includes an identity query engine 210, a reputation analyzer 220, and a composite identity generator 230. Identity requestor 122 may be communicatively coupled with a user identity repository 240 that stores composite user identities generated by composite identity generator 230.

Identity query engine 210 generally generates a request for user identity information from a plurality of service providers 120 in a computing environment 100. In some cases, identity query engine 210 may be invoked when a user attempts to register for access to a service provided by a service provider 120. Where identity requestor 122 is deployed in a proxy service provider 130, identity query engine 210 may be invoked upon receipt of a request for a composite identity from a service provider 120 that obtains composite user identities from proxy service provider 130.

The request for user identity information generated by identity query engine 210 may include, for example, user identity information provided by a user to service provider 120. In some cases, where the user identity information provided by the one or more service providers 120 is to be valid for a specified amount of time, identity query engine 120 may include the specified amount of time in the request for user identity information. As discussed, the inclusion of a specified amount of time for which user identity information should be valid may indicate that the one or more service providers 120 are to stake a portion of their global reputation scores on the continued validity of the requested user identity information for the specified amount of time.

Reputation analyzer 220 generally receives global reputation data from a plurality of service providers 120 in computing environment 100. In some embodiments, based on the reputation data associated with each of the plurality of service providers 120, reputation analyzer 220 can generate a composite score representing the relative trustworthiness of a composite user identity generated from the user identity information provided by the plurality of service providers 120. As discussed, the composite score generated for a composite user identity may be based on the reputation score maintained by the requesting service provider hosting identity requestor 122 for each of the service providers 120 in computing environment 100. In some embodiments, reputation analyzer 220 can compare the composite score to a threshold score to determine whether to accept or reject a composite user identity generated from user identity information provided by the plurality of service providers 120. If the composite score meets or exceeds the threshold score, identity requestor 122 may proceed with generating a composite identity from the user identity information received from the plurality of service providers 120 or retain an already-generated composite user identity (e.g., if a service provider uses the composite user identity generation process to periodically verify the authenticity and validity of previously generated composite user identities). Otherwise, identity requestor 122 may terminate a composite user identity generation process (e.g., a process performed by composite identity generator 230) or discard an already-generated composite user identity (e.g., in a periodic composite user identity verification process). In some embodiments, when the composite user identity generation process is terminated, identity requestor 122 may, for example, initiate alternative user identity capture and verification processes (e.g., requesting additional information from a user that can be verified against known and trusted data sources) or terminate a user account creation process.

Reputation analyzer 220 may, in some cases, use the global reputation data from each of the plurality of service providers to identify the user identity information to use and the user identity information to exclude from a set of user identities used to generate the composite user identity. To select the user identity information to use and the user identity information to exclude, reputation analyzer 220 can compare the global reputation score of a service provider 120 to a threshold score maintained by the requesting service provider hosting identity requestor 122. If the global reputation score of a service provider 120, which represents a collective judgment of the reputation and trustworthiness of a service provider, meets or exceeds a threshold score maintained by the requesting service provider, reputation analyzer 220 can include the user identity information from that service provider in a subset of user identity information used to generate a composite user identity. If, however, reputation analyzer 220 determines that the global reputation score of a service provider 120 is less than the threshold score, reputation analyzer 220 can discard the user identity information provided by that service provider 120 or otherwise exclude the user identity information from the subset of user identity information used in generating a composite user identity.

Composite identity generator 230 uses the identity information received from the plurality of service providers 120 in computing environment 100 to generate a composite identity that a requesting service provider 120 can use to authenticate a user and allow (or disallow) user access to a service. As discussed, composite identity generator 230 can identify information in the user identity information received from a service provider 120 to verify user identity information provided to a requesting service provider 120 by a user and/or other service providers 120 in computing environment 100. Where user identity information from a service provider 120 includes additional data beyond the data that has already been populated into a composite user identity (either from user-provided input or other service providers 120 in computing environment 100), the additional data may be added to the composite user identity.

In some embodiments, as discussed, a requesting service provider 120 may specify that the user identity information returned by a plurality of service providers 120 is to remain valid for a specified period of time. To verify that the user identity information is valid, a requesting service provider may query the source of user identity information to determine if the user identity information has changed during the specified time period. For example, a requesting service provider 120 may periodically query another service provider for user identity information and examine the stored and received user identity information for differences. In another case, a requesting service provider 120 may query another service provider for user identity information at expiry of the specified period of time and examine the stored and received user identity information for differences. If a difference is detected between the stored and received user identity information, composite identity generator 230 at the requesting service provider 120 can compare the received user identity information to user identity information stored at one or more a priori known, trusted service provider or other source of user identity information (e.g., banks required to comply with "know your client" regulations, government agencies, and the like) to determine whether the received user identity information represents a legitimate change. If composite identity generator 230 determines that the newly received user identity information does not match the user identity information at a known, trusted service provider or other source of user identity information, composite identity generator 230 can determine that the user identity information initially provided by a service provider was not valid for the specified period of time. In response, composite identity generator 230 can indicate to the source service provider 120 that the global reputation score of the source service provider 120 is to be reduced by an amount staked by the source service provider 120. In another aspect, received user identity information can include an explicit indication that the user identity information has changed since the original delivery of the user identity information and that the new user identity information has been verified. If the explicit indication is included in the received user identity information, composite identity generator 230 can determine that the user identity information provided by the source service provider is valid (even though the user identity information has changed) such that the global reputation score of the source service provider is not reduced by the staked amount.

Figure 3:
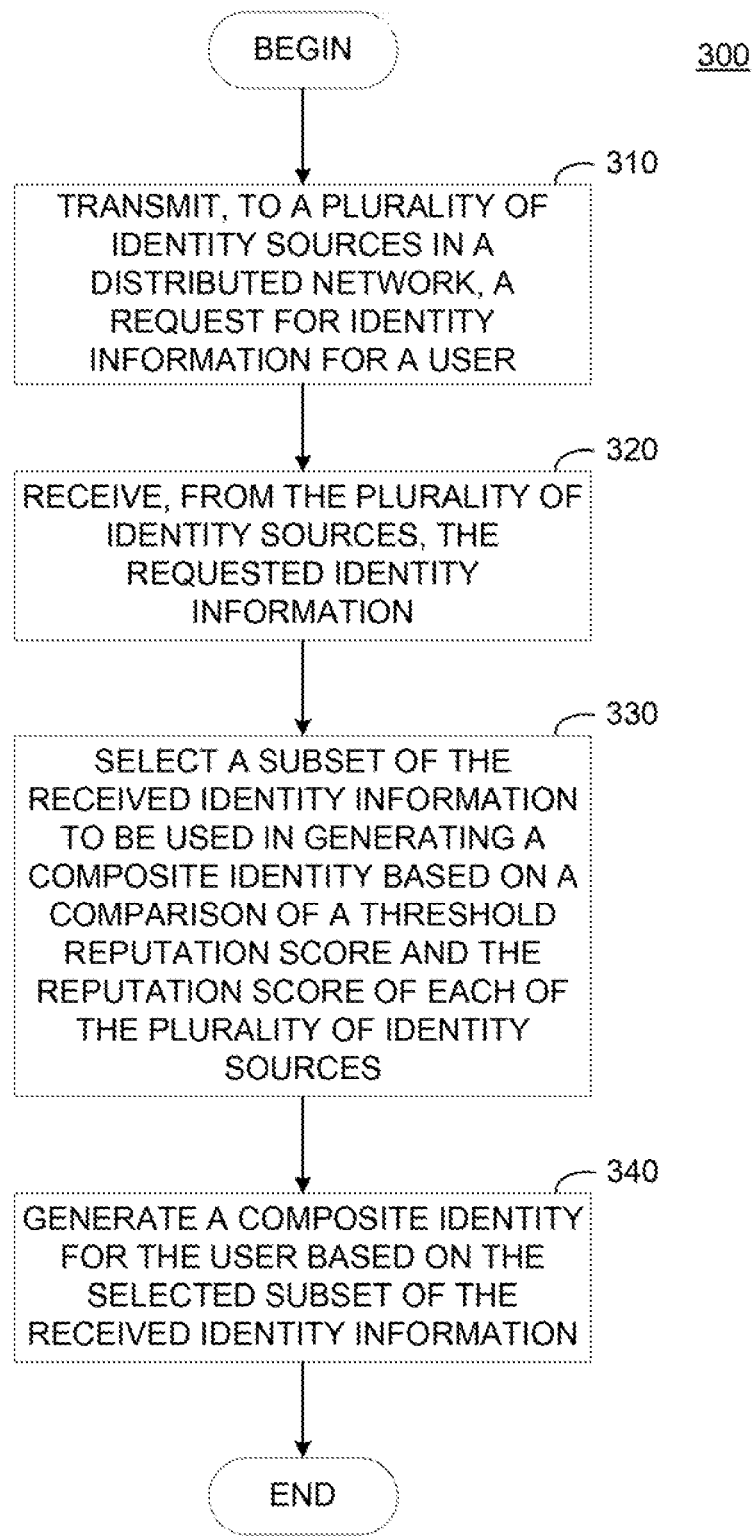
FIG. 3 illustrates exemplary operations that may be performed by a user identity requestor to obtain user identity information from a plurality of service providers in a distributed network and to generate a composite identity from the obtained user identity information, according to an embodiment.

FIG. 3 illustrates exemplary operations 300 that may be performed by a requesting service provider 120 for generating a composite identity from user identity information received from a plurality of service providers in a computing environment, according to an embodiment. As illustrated, operations 300 begin at step 310, where a requesting service provider 120 transmits, to a plurality of identity sources in a distributed network, a request for identity information about a user. The requesting service provider 120 may identify the plurality of identity sources in the distributed network through a list of identity sources that is periodically updated as new identity sources join the distributed network (e.g., when a new identity source broadcasts its existence to the members of the distributed network). As discussed, each of the plurality of identity sources in a distributed network may be a service provider that maintains user identity information for use in allowing or disallowing access to a service, such as a financial service, a messaging service, a social networking service, and so on. The request may include user-provided identity information, such as a name and contact information, which may be used by the plurality of identity sources to search for and return additional user identity information to the requesting service provider 120.

At step 320, the requesting service provider 120 receives, from the plurality of identity sources, the requested identity information. In some cases, the responses from each of the plurality of identity sources may include a response indicating whether the identity source has user identity information associated with the provided user identity information. If the response includes an affirmative indication, the response may additionally include other user identity information maintained by an identity source. For example, in response to a request for user identity information including a user's legal name and contact information, a financial services institution may return data such as the user's permanent address, the identification numbers associated with a user (e.g., a U.S. Social Security Number or Tax Identification Number, a driving license number, and the like), information about whether the user has a verified signature and other identity information on file, and so on. In some embodiments, where a service provider shares sensitive information such as a U.S. Social Security Number with another service provider, that information may be shared in an encrypted format using a commonly agreed-upon set of cryptographic keys to protect the underlying data from interception. Alternatively, in some embodiments, the sensitive information may be initially shared as a cryptographic hash, and if the requesting service provider 120 wants the underlying data, the requesting and providing service providers can perform a key negotiation procedure to agree upon a cryptographic key (or set of cryptographic keys) to use in securely sharing the sensitive information. In another example, a social networking service may return data including other contact information for the user (e.g., other phone numbers, other e-mail addresses on file, other social networking handles connected to the user account, and so on).

At step 330, the requesting service provider 120 selects a subset of the received user identity information to be used in generating a composite identity. The selection of the subset of received user identity information may, in some embodiments, be based on a comparison of a threshold reputation score to the global reputation scores of each of the plurality of identity sources (or service providers) that responded to the request for user identity information with an affirmative response and additional user identity information. As discussed, the threshold reputation score may be established at a service provider 120 such that user identity information from authoritative sources or entities that perform a similar level of user identity verification are included in the subset of the received user identity information. User identity information from sources that do not perform similar amounts of user data verification may be omitted from the subset of the received user identity information to be used in generating the composite identity.

At step 340, the requesting service provider 120 generates a composite identity for the user based on the selected subset of the received user identity information. As discussed, the composite identity may be generated by verifying that information known to each of the selected service providers is the same and by augmenting the commonly known information with information that is known only to certain identity providers. In some embodiments, where a discrepancy exists between the user identity information provided by multiple service providers, the requesting service provider 120 can presume that the user identity information provided by the most trustworthy service provider is accurate and use that data in generating the composite identity. In some cases, the composite identity may be generated from all of the received user identity information received from the service providers 120 in the computing environment 100. In such a case, the requesting service provider 120 can generate a composite score from the global reputation scores associated with each service provider 120. As discussed, if the composite score is less than a threshold score, the requesting service provider 120 can reject the composite identity. In response to rejecting the composite identity, the requesting service provider 120 can initiate a user identity verification process of its own or block a user from accessing a service.

Figure 4:
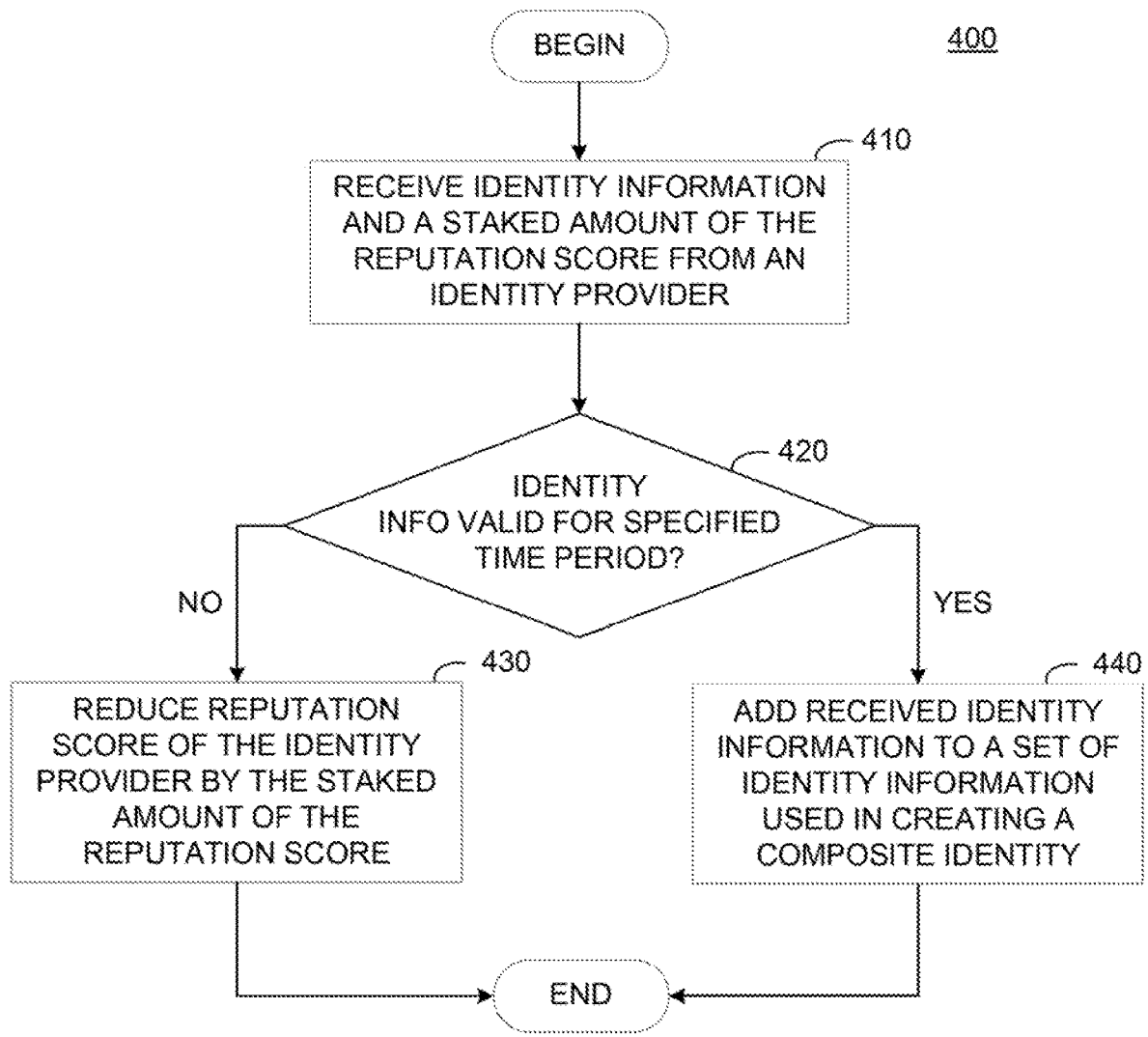
FIG. 4 illustrates exemplary operations that may be performed by a user identity requestor to determine whether to accept user identity information obtained from a service provider for use in generating a composite identity, according to an embodiment.

FIG. 4 illustrates exemplary operations that may be performed by a requesting service provider 120 to manage a staked reputation score for a user identity, according to an embodiment. As illustrated, operations 400 begin at step 410, where the requesting service provider 120 receives identity information and a staked reputation score from an identity provider. As discussed, the requesting service provider 120 may receive the identity information and the staked reputation score in response to a request for user identity information that indicates that the user identity information provided by a service provider 120 is to remain valid for a specified period of time.

At step 420, the requesting service provider 120 determines whether the identity information has remained valid for the specified period of time. In some embodiments, the requesting service provider 120 can determine whether the identity information has remained valid for the specified period of time by periodically querying the identity provider for the user identity information. If the user identity information changes between queries for identity information, the requesting service provider 120 can determine that the previously provided user identity information is no longer valid and that the previously provided user identity information has not remained valid for the specified period of time. In some embodiments, the requesting service provider 120 can compare the identity information received in response to the initial request and identity information received at expiry of the specified period of time to determine whether the initially received identity information has remained valid for the specified period of time.

If, at step 420, the requesting service provider 120 determines that the identity information has not remained valid for the specified period of time, at step 430, the requesting service provider 120 reduces the reputation score of the identity provider by the staked amount of the reputation score. The requesting service provider 120 can notify the identity provider that the provided user identity information is no longer valid and initiate a broadcast to inform other service providers 120 (and, if present, proxy service providers 130) in computing environment 100 to reduce the reputation score of the identity provider by the staked amount of the reputation score.

If, however, at step 420, the requesting service provider 120 determines that the identity information has remained valid for the specified period of time (as discussed above), at step 440, the requesting service provider 120 adds the received identity information to a set of user identity information used in creating a composite identity. Because the information remained valid for the specified period of time, the user identity data provided by the identity provider may be considered accurate and reliable. The user identity information received from the identity provider may thus be used to generate a composite user identity with information that is known to accurately represent the user.

Figure 5:
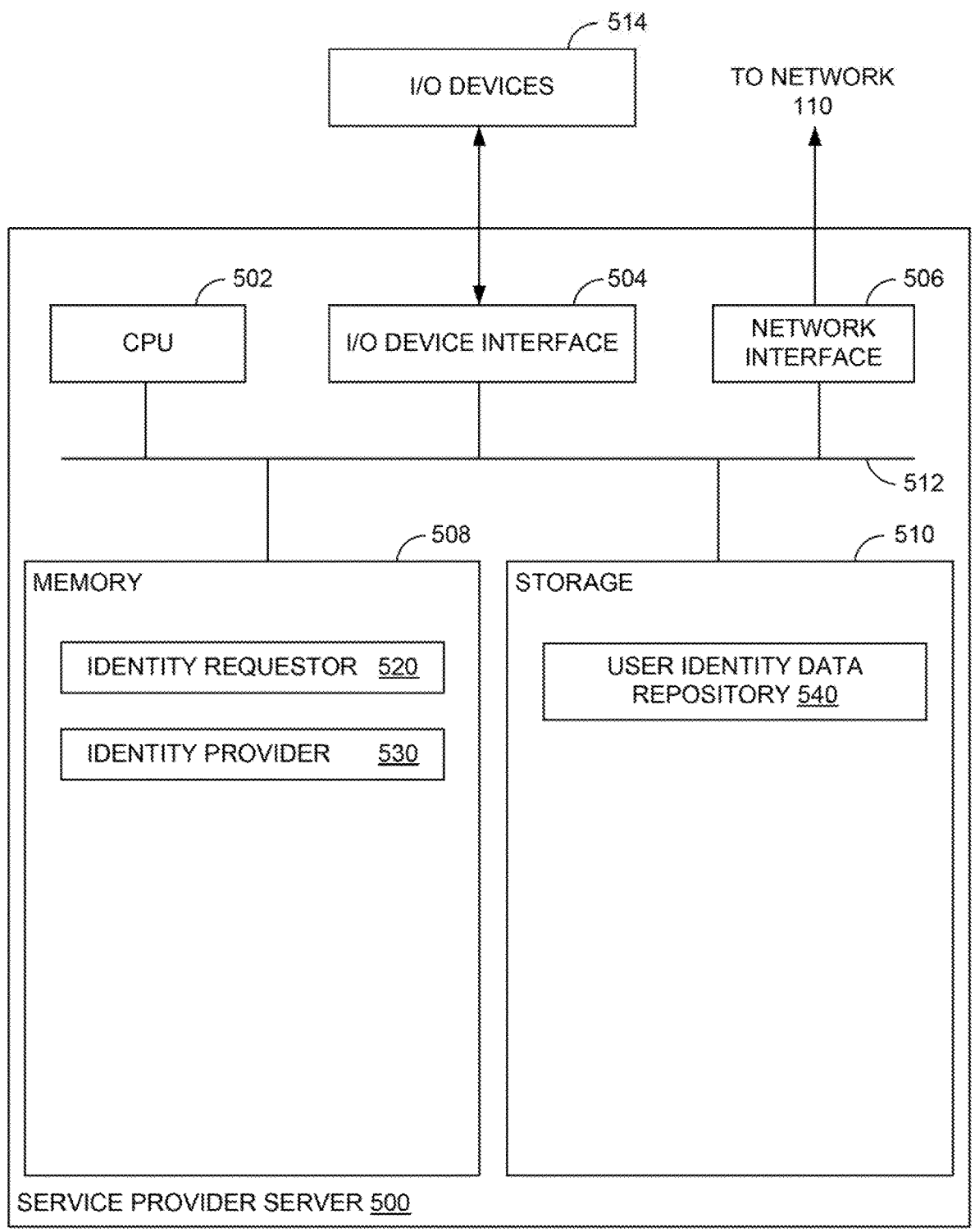
FIG. 5 illustrates an exemplary system for providing and requesting user identity information from members of a distributed network, according to an embodiment.

FIG. 5 illustrates an exemplary service provider server 500, according to an embodiment. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes an identity requestor 520 and an identity provider 530. As discussed, identity requestor 520 generally generates one or more requests for user identity information and transmits the requests to the plurality of service providers 120 in computing environment 100 via network interface 506. The requests for user identity information may be generated to supplement user-provided information with information that has been verified by other services in computing environment 100. In response, identity requestor 520 receives a plurality of messages from the other service providers 120 (and, if present, proxy service providers 130) in computing environment 100 via network interface 506 indicating whether a service provider 120 has information about the user and, if so, the additional information that the service provider 120 possesses and has previously verified. Identity requestor 520 can select a subset of the responses from which identity requestor 520 generates a composite user identity by removing at least the responses from service providers that returned a negative response to the service provider server 500. In some embodiments, identity requestor 520 may additionally remove user identity information from the set of information used to generate a composite user identity if the reputation score of the source of the identity information is less than a threshold score. Based on the selected subset of user identity information, identity requestor 520 generates a composite identity for a user that service provider server 500 can use to allow (or disallow) access to a service hosted on service provider server 500.

In some embodiments, as discussed herein, identity requestor 520 can indicate, in the request for user identity information, that user identity information is to be valid for a specified period of time. Responses to the request for user identity information may include an amount of a reputation score that is staked, or put at risk of loss, by each service provider 120 that provides user identity information to identity requestor 520. If, within the specified period of time, the user identity information provided by a specific service provider 120 changes, identity requestor 520 can determine that the service provider 120 violated the specification that user identity information be valid for the specified period of time. In response, identity requestor 520 can initiate a reduction of the global identity score of the service provider 120 by the amount of the reputation score staked by that service provider.

Identity provider 530 generally receives requests for user identity information from one or more service providers 120 and generates a response to each request. If service provider server 500 does not include user identity information matching the user specified in a request, identity provider 530 generates a negative response and transmits the negative response to the requesting service provider 120. Otherwise, identity provider 530 generates a positive response indicating that the user is known to service provider server 500. The positive response additionally includes user identity information that is known to service provider server 500 (e.g., user identity information already stored in user identity data repository 540) and which may be used to augment and/or verify user identity information at the requesting service provider 120.

Storage 510 generally includes user identity data repository 540. User identity data repository 540 generally stores the composite identities generated from user identity information sourced from other service providers 120 in a computing environment 100 and user identity information provided by users of the service provided by service provider server 500. When a new user is added to user identity data repository 540, identity requestor 520 uses the user data stored in user identity data repository 540 to request user identity data from other service providers 120 in computing environment 100. Based on the responses from the other service providers 120, the user data stored in user identity data repository 540 may be augmented to include additional information that has been verified by the other service providers 120. When identity provider 530 receives a request for user identity information from another service provider 120 in computing environment 100 (or a proxy service provider 130, if applicable), identity provider 530 searches for data in user identity data repository 540 matching the provided user identity information. As discussed, identity provider 530 can return a negative message if no matching user identity information is found in user identity data repository 540 and can return a positive message with additional user identity information if matching user identity information is found in user identity data repository 540.

Advantageously, by using crowdsourced user identity data to generate composite user identities, service providers can leverage the data vetting and verification processes of other service providers to verify and augment user-provided identity data. This may increase the security of a computing system, as user identities associated with users who are allowed to access the computing system may be derived, directly or indirectly, from user data that has been verified according to processes of various stringency based on the needs of a particular service provider. Further, where user identity information is to be valid for a specified amount of time, staking a portion of a reputation score used in judging whether user identity data provided by a service provider is trustworthy may further enhance the security of the computing system. Owners of a service provider that stakes a portion of its reputation score may, for example, implement additional processes for verifying user identity to ensure that user identity information provided to other service providers in a computing environment is valid for at least a specified period of time.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples a computer-readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for authenticating users in a computing system, comprising:
   receiving a request to register a user with an access-controlled computing system;
   receiving a composite user identity for the user from an identity service, the composite user identity having been generated based on user identity information retrieved from a plurality of identity providers and a reputation score associated with each identity provider of the plurality of identity providers;
   calculating a composite reputation score for the composite user identity based on the reputation score associated with each identity provider of the plurality of identity providers; and
   taking one or more actions to manage registration of the user with the access-controlled computing system based on a comparison of the calculated composite reputation score and a threshold reputation score.

2. The method of claim 1, wherein:
   the comparison indicates that the composite reputation score is less than the threshold reputation score, and
   taking the one or more actions comprises rejecting the composite user identity such that the user is blocked from accessing the access-controlled computing system using the composite user identity.

3. The method of claim 2, wherein the taking one or more actions further comprises:
   requesting additional user identity information from the user;
   receiving the additional user identity information; and
   verifying the composite user identity based on the requested additional user identity information.

4. The method of claim 1, wherein:
   the comparison indicates that the composite reputation score meets or exceeds the threshold reputation score, and
   taking the one or more actions comprises:
      committing the composite user identity to a user data repository, and
      associating the composite user identity with login credentials for accessing services in the access-controlled computing system.

5. The method of claim 1, wherein:
   the comparison indicates that the composite reputation score meets or exceeds the threshold reputation score, and
   taking the one or more actions comprises:
      verifying that previously received user identity information associated with the user matches the composite user identity, and
      allowing the user to access services in the access-controlled computing system based on verifying that the previously received user identity information matches the composite user identity.

6. The method of claim 1, wherein:
   the comparison indicates that the composite reputation score meets or exceeds the threshold reputation score, and
   taking the one or more actions comprises:
      comparing previously received user identity information to the composite user identity, and
      based on the comparison indicating that the previously received user identity information does not match the composite user identity, blocking the user from accessing services in the access-controlled computing system.

7. The method of claim 1, wherein the composite user identity comprises a user identity generated from information associated with a subset of the plurality of identity providers having reputation scores greater than a threshold reputation score.

8. The method of claim 1, wherein the identity service comprises a proxy service in a distributed network.

9. The method of claim 8, wherein the reputation score associated with each identity provider of the plurality of identity providers comprises a score maintained by the proxy service for each identity provider of the plurality of identity providers.

10. A system, comprising:
    a processor; and
    a memory having instructions stored thereon which, when executed by the processor, performs an operation for authenticating users in a computing system, the operation comprising:
       receiving a request to register a user with an access-controlled computing system,
       receiving a composite user identity for the user from an identity service, the composite user identity having been generated based on user identity information retrieved from a plurality of identity providers and a reputation score associated with each identity provider of the plurality of identity providers,
       calculating a composite reputation score for the composite user identity based on the reputation score associated with each identity provider of the plurality of identity providers, and
       taking one or more actions to manage registration of the user with the access-controlled computing system based on a comparison of the calculated composite reputation score and a threshold reputation score.

11. The system of claim 10, wherein:
    the comparison indicates that the composite reputation score is less than the threshold reputation score, and
    taking the one or more actions comprises rejecting the composite user identity such that the user is blocked from accessing the access-controlled computing system using the composite user identity.

12. The system of claim 11, wherein the taking one or more actions further comprises:
   requesting additional user identity information from the user;
   receiving the additional user identity information; and
   verifying the composite user identity based on the requested additional user identity information.

13. The system of claim 10, wherein:
   the comparison indicates that the composite reputation score meets or exceeds the threshold reputation score, and
   taking the one or more actions comprises:
      committing the composite user identity to a user data repository, and
      associating the composite user identity with login credentials for accessing services in the access-controlled computing system.

14. The system of claim 10, wherein:
   the comparison indicates that the composite reputation score meets or exceeds the threshold reputation score, and
   taking the one or more actions comprises:
      verifying that previously received user identity information associated with the user matches the composite user identity, and
      allowing the user to access services in the access-controlled computing system based on verifying that the previously received user identity information matches the composite user identity.

15. The system of claim 10, wherein:
   the comparison indicates that the composite reputation score meets or exceeds the threshold reputation score, and
   taking the one or more actions comprises:
      comparing previously received user identity information to the composite user identity, and
      based on the comparison indicating that the previously received user identity information does not match the composite user identity, blocking the user from accessing services in the access-controlled computing system.

16. The system of claim 10, wherein the composite user identity comprises a user identity generated from information associated with a subset of the plurality of identity providers having reputation scores greater than a threshold reputation score.

17. The system of claim 10, wherein the identity service comprises a proxy service in a distributed network.

18. The system of claim 17, wherein the reputation score associated with each identity provider of the plurality of identity providers comprises a score maintained by the proxy service for each identity provider of the plurality of identity providers.

19. A method for authenticating users in a computing system, comprising:
   receiving a request to register a user with an access-controlled computing system;
   receiving a composite user identity for the user from an identity service, the composite user identity having been generated based on user identity information retrieved from a plurality of identity providers and a reputation score associated with each identity provider of the plurality of identity providers;
   calculating a composite reputation score for the composite user identity based on the reputation score associated with each identity provider of the plurality of identity providers;
   determining that the composite reputation score is less than a threshold reputation score; and
   rejecting the composite user identity such that the user is blocked from accessing the access-controlled computing system using the composite user identity.

20. The method of claim 19, further comprising:
   requesting additional user identity information from the user;
   receiving the additional user identity information;
   verifying the composite user identity based on the requested additional user identity information; and
   based on verifying the composite user identity, granting the user access to the access-controlled computing system.

* * * * *